United States Patent [19]

Smetz

[11] Patent Number: 5,697,660
[45] Date of Patent: Dec. 16, 1997

[54] HANDLING AID

[75] Inventor: Reinhard Georg Erich Smetz, Baldingen, Germany

[73] Assignee: RUD-Kettenfabrik Rieger & Dietz GmbH. u.Co., Aalen, Germany

[21] Appl. No.: 633,809
[22] PCT Filed: Oct. 7, 1994
[86] PCT No.: PCT/DE94/01219
 § 371 Date: Apr. 17, 1996
 § 102(e) Date: Apr. 17, 1996
[87] PCT Pub. No.: WO95/11851
 PCT Pub. Date: May 4, 1995

[30] Foreign Application Priority Data

Oct. 25, 1993 [DE] Germany .............. 43 36 782.8

[51] Int. Cl.$^6$ .................................. B65G 7/12
[52] U.S. Cl. ............... 294/137; 294/26; 294/141; 294/15.9
[58] Field of Search ............... 294/15, 26, 82.11, 294/82.12, 137, 141, 153, 154, 74, 159, 162, 170; 224/103

[56] References Cited

U.S. PATENT DOCUMENTS

| 338,885 | 3/1886 | Stockinger | 294/26 |
| 2,436,247 | 2/1948 | Bufflap | 294/82.12 |
| 3,790,050 | 2/1974 | Sullivan | 294/137 |
| 4,248,469 | 2/1981 | Knox | 294/82.12 |

FOREIGN PATENT DOCUMENTS

| 2352205 | 12/1977 | France | 294/82.12 |
| 2935094 | 3/1981 | Germany . | |
| 3903138 | 8/1989 | Germany . | |
| 9100829 | 4/1991 | Germany . | |
| 8913889 | 5/1991 | Germany . | |
| 2000743 | 1/1979 | United Kingdom . | |

*Primary Examiner*—Dean Kramer
*Attorney, Agent, or Firm*—Mark P. Stone

[57] ABSTRACT

A handling aid for lifting and transporting loads is provided having a handle (1) and a bracket (2) with longitudinal slots (13; 14) into which interchangeable securing or lifting elements (16, 27) can be readily and quickly inserted. The bracket can be formed from two halves extending from the vertex of the bracket to opposed ends of the handle, and each of the two bracket halves can be provided with at least one introduction opening and a corresponding longitudinal slot. The retaining or lifting elements can be sling chains, hooks, and gripping tools.

15 Claims, 3 Drawing Sheets

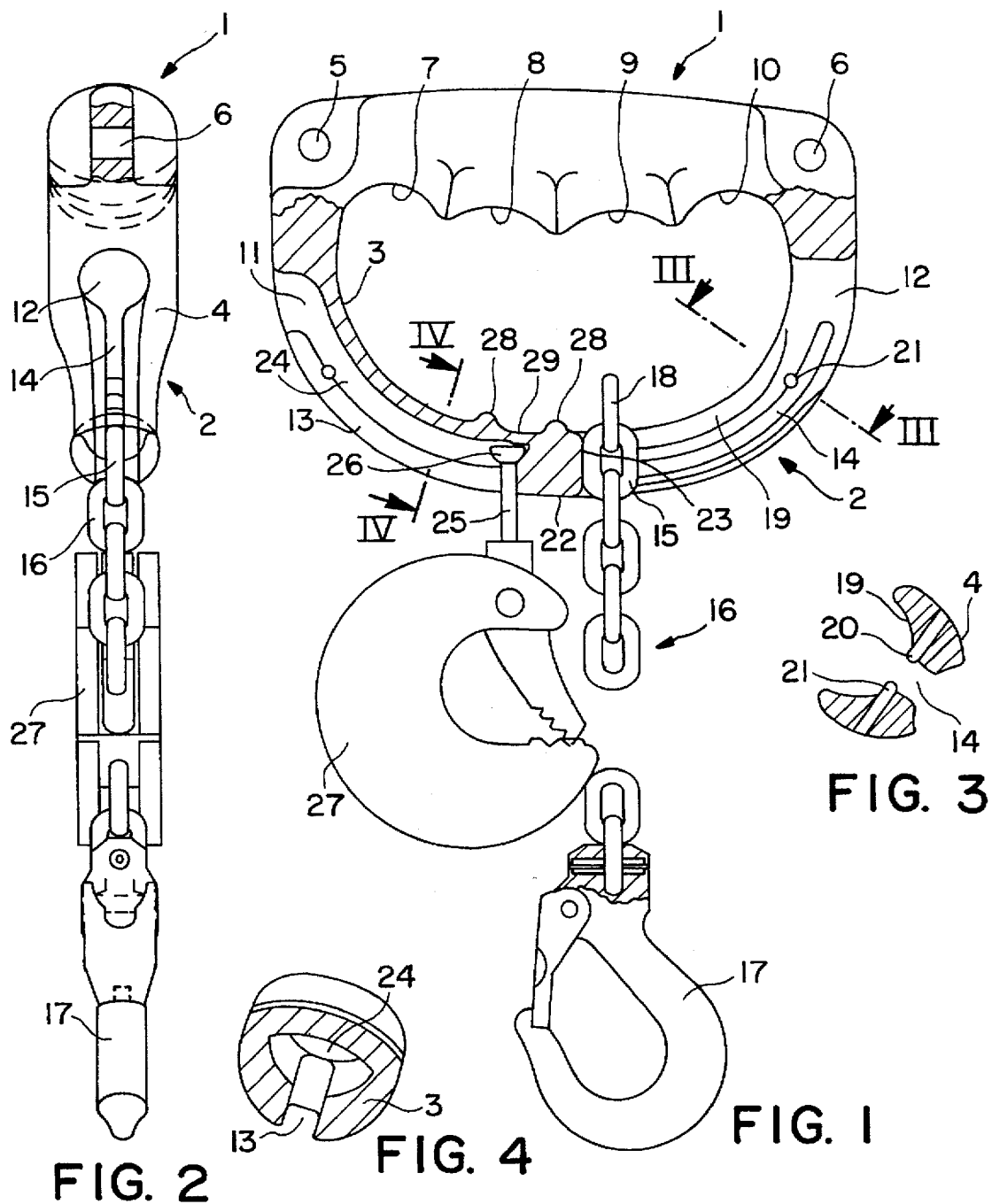

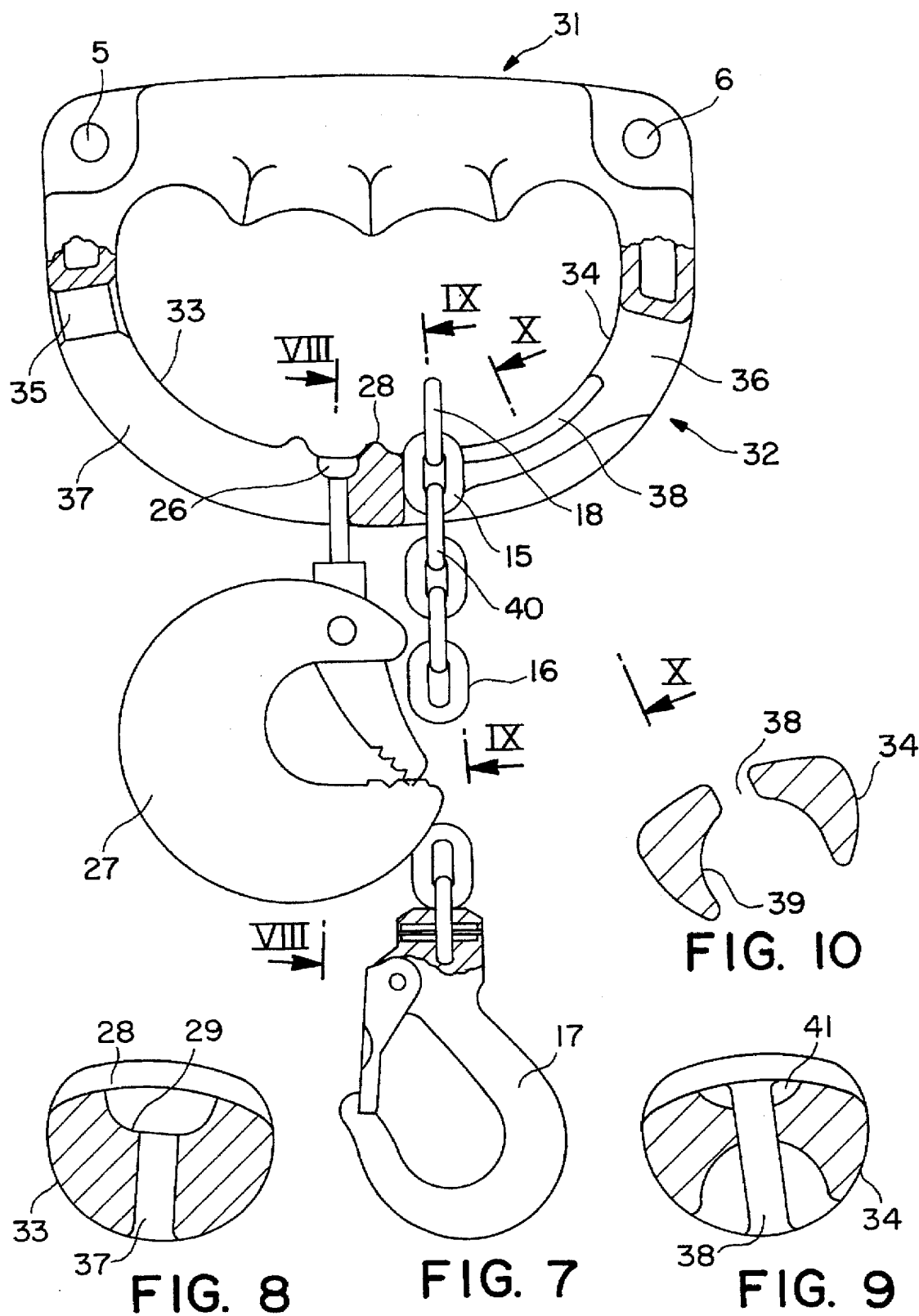

5,697,660

HANDLING AID

BACKGROUND OF THE INVENTION

The invention relates to a handling aid for lifting and transporting loads, having a hand grip and a bracket which is connected to the ends of said hand grip and to which it is possible to connect retaining or lifting means, such as sling chains, hooks, eyelets or gripping tools.

A handling aid, designed as a gripper hand tool, of the type in question is known, and a pin of a connection fork for a hook is mounted rotatably in the bracket of said handling aid. This handling aid leaves something to be desired since it can only be used for special applications.

SUMMARY OF THE INVENTION

The object of the invention is to provide a handling aid which permits rapid and convenient exchange of retaining or lifting means and consequently can be used for a wider variety of applications than the known handling aid. This object is achieved according to the invention in that, in the case of a handling aid of the generic type, the bracket has at least one longitudinal slot at whose end facing the hand grip there is arranged an introduction opening for parts of the retaining or lifting means, which parts are supported on those sections of the bracket which bound the longitudinal slot, and in that the longitudinal slot extends from the introduction opening into the vicinity of the vertex of the bracket.

BRIEF DESCRIPTION OF THE DRAWINGS

The invention is explained in more detail herein-below with reference to the accompanying drawings, in which:

FIG. 1 shows the front view of a first handling aid,

FIG. 2 shows the side view of the handling aid according to FIG. 1,

FIG. 3 shows a section along line III—III in FIG. 1,

FIG. 4 shows a section along line IV—IV in FIG. 1,

FIG. 7 shows the front view of a modified handling aid, FIG. 8 shows a section along line VIII—VIII in FIG. 7, FIG. 9 shows a section along line IX—IX in FIG. 7, and FIG. 10 shows a section along line X—X in FIG. 7.

DESCRIPTION OF THE BEST MODES FOR CARRYING OUT THE INVENTION

Figure 6:
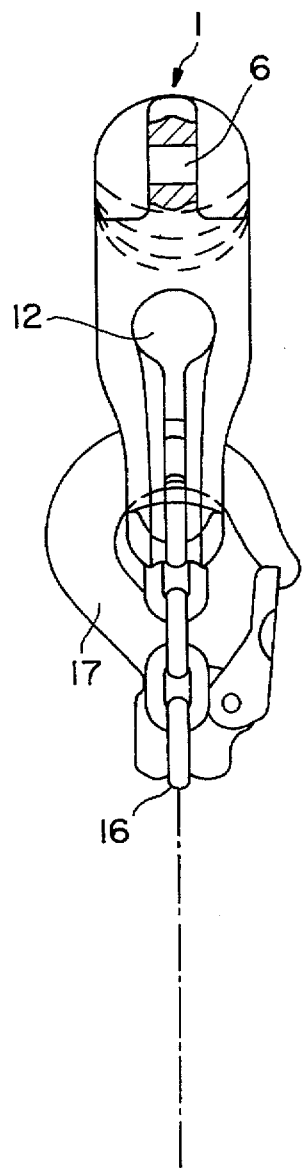
FIG. 6 shows the side view of the handling aid according to FIG. 5.

The handling aid represented in FIGS. 1 to 6 has a hand grip 1 and a bracket 2 which comprises two bracket halves 3 and 4. The hand grip 1, which is equipped at its ends with eyelets 5 and 6 for the attachment of shackles (not shown), has a slightly convex shape and is provided, on its side facing the bracket 2, with grip hollows 7, 8, 9, 10 for the fingers of the user, this permitting it to be positioned comfortably in the hand. The top of the hand grip 1 defines a substantially straight edge.

In the immediate vicinity of the ends of the hand grip 1, the arcuate bracket 2 has introduction openings 11 and 12, which are adjoined by longitudinal slots 13 and 14. Fitted into the longitudinal slot 14 is a link 15 of a length of chain which forms a retaining or lifting means 16 and at whose free end a hook 17 is fastened. The length of chain is retained by a part 18 which is formed by a link and is supported in a hollow-like guideway 19 on that side of the bracket half 4 which faces the hand grip 1.

The top ends of two pins made of elastic material project into the longitudinal slot 14, in the vicinity of the introduction opening 12, and the tips of these pins form latching protrusions 20, 21 for the link 15 and prevent said link from slipping out of the longitudinal slot 14 when the length of chain is relieved of its load.

In the region of the vertex 22 of the bracket 2, the latter has a stop 23 which is formed by a reinforcement web and is intended for the link 15 of the retaining or lifting means 16.

Extending from the introduction opening 11 is a guide duct 24, into which there is guided a head-like part 26 which is arranged at the end of a retaining rod 25, is formed by a body of rotation, and is supported on that section of the bracket half 3 which bounds the longitudinal slot 13. In the case represented, a retaining or lifting means 27 formed by a gripping hook is connected to the retaining rod 25.

Figure 5:
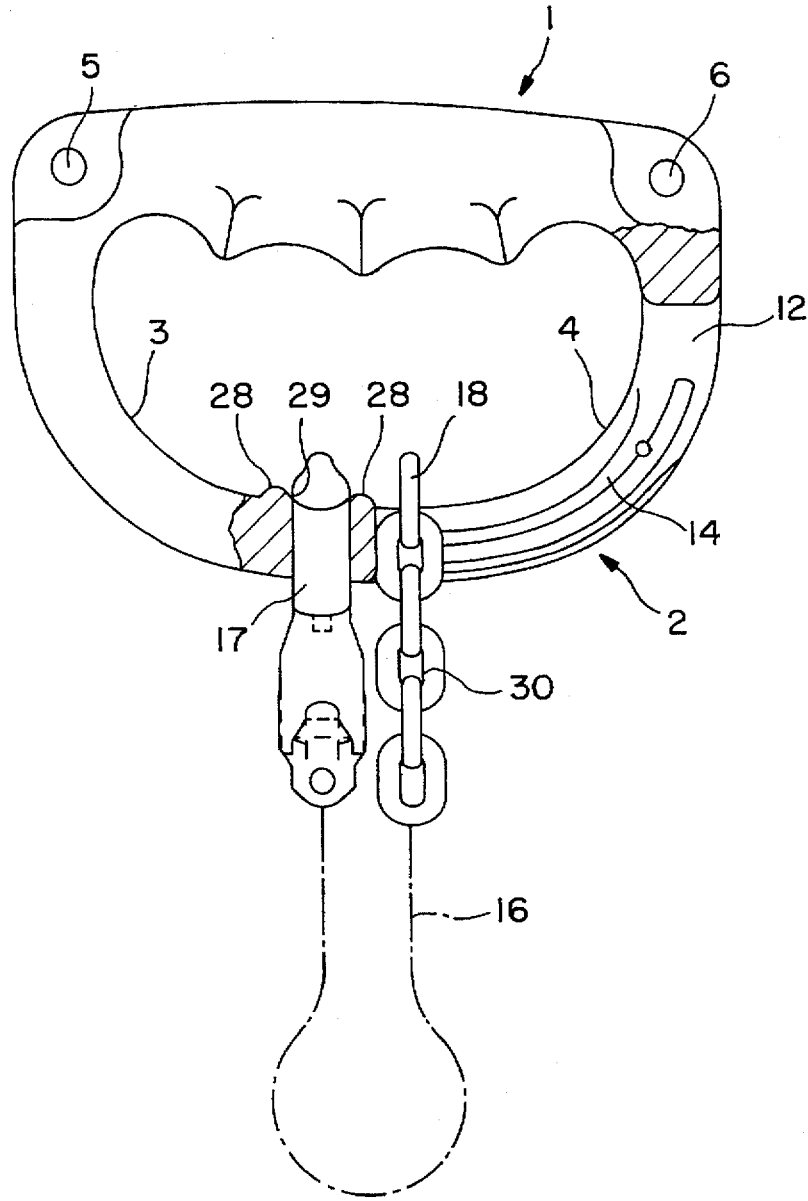
FIG. 5 shows the front view of the handling aid according to FIG. 1 with a retaining or lifting means designed as a loop-type chain.

FIGS. 5 and 6 show the handling aid represented in FIGS. 1 to 4 after the retaining or lifting means 27 has been removed and the hook 17 has been fitted into a latching hollow 29 bounded by two transverse ribs 28. In this manner, a loop-type chain of variable length can be formed by the retaining or lifting means 16. Of course, the retaining or lifting means 16 may also be fed through a bore of a structural part. For this purpose, inserts 30 of a flexible material are embedded in a few links arranged at that end of the length of chain, forming the retaining or lifting means 16, which is remote from the hook 17, and these inserts provide this end with a degree of, as it were, flexible rigidity which facilitates introduction into a bore.

A slightly modified handling aid is represented in FIGS. 7 to 10, in which figures the same reference numerals as in FIGS. 1 to 6 are used for corresponding parts. Unlike the initially described design, the part 18 of the retaining or lifting means 16 and the part 26 of the retaining or lifting means 27 are supported, here, on that side of the bracket 32 which faces the hand grip 31. Once again, the bracket halves 33 and 34 have introduction openings 35, 36 and longitudinal slots 37, 38. In order to be able to introduce the link 15 into the longitudinal slot 38, that side of the bracket 32 which is remote from the hand grip 31 is provided with a guideway 39 for a link 40. At the end of the longitudinal slot 38, the part 18 can latch into a latching hollow 41.

I claim:

1. A handling aid for lifting and transporting loads, said handling aid having a hand grip including a portion thereof which defines a substantially straight edge, and a bracket which is connected to the ends of said hand grip and to which it is possible to connect retaining or lifting means; wherein the bracket (2; 32) has at least one longitudinal slot (13; 14; 37; 38) at which end facing the hand grip (1; 31) there is arranged an introduction opening (11; 12; 35; 36;) for parts (18; 26) of the retaining or lifting means (16; 27), which parts are supported on those sections of the bracket (2; 32) which bound the longitudinal slot (13; 14; 37; 38); and wherein the longitudinal slot (13; 14; 37; 38) extends from the introduction opening (11; 12; 35; 36) into the vicinity of a vertex (22) of the bracket (2; 32).

2. The handling aid as claimed in claim 1, wherein the two bracket halves (3; 4; 33; 34) extending from the vertex (22) of the bracket (2; 32) to the ends of the hand grip (1; 31) are each provided with at least one longitudinal slot (13; 14; 37; 38) and an introduction opening (11; 12; 35; 36).

3. The handling aid as claimed in claim 2, wherein the introduction opening (11; 12; 35; 36) of each longitudinal slot (13; 14; 37; 38) is arranged, in the immediate vicinity of the ends of the hand grip (1; 31), in a section of the bracket (2; 32) which runs essentially perpendicularly with respect to the longitudinal axis of the hand grip (1; 31).

4. The handling aid as claimed in claim 1, wherein there is arranged, in the region of the vertex (22) of the bracket (2; 32), a stop (23) for the retaining or lifting means (16; 27) fitted in each case into a longitudinal slot (13; 14; 37; 38) of the bracket (2; 32).

5. The handling aid as claimed in claim 1, wherein, in the region of its vertex (22), the bracket (2; 32) is provided with at least one latching hollow (29; 41) for the part (18; 26) of the retaining or lifting means (16; 27), which part is supported on that section of the bracket (2; 32) which bounds the longitudinal slot (13; 14; 37; 38).

6. The handling aid as claimed in claim 1, wherein at least one elastic latching protrusion (20, 21) is arranged at that end of each longitudinal slot (13; 14) which faces the introduction opening (11; 12).

7. The handling aid as claimed in claim 1, wherein a guide duct (24) arranged in the interior of the bracket (2) is connected to the surroundings by way of at least one longitudinal slot (13).

8. The handling aid as claimed in claim 1, wherein, in the region of at least one longitudinal slot (14), the bracket (2) is provided, on its side facing the hand grip (1), with a hollow-like guideway (19) for the part (18), fitted into the longitudinal slot (14), of the retaining or lifting means (16).

9. The handling aid as claimed in claim 1, wherein a latching hollow (29) which runs transversely with respect to the bracket plane and is intended for the hook (17) of a retaining or lifting means (16) fitted into a longitudinal slot (14) is arranged in the region of the vertex (22) of the bracket (2).

10. The handling aid as claimed in claim 1, wherein in each case one eyelet (5, 6) for the attachment of a shackle is arranged at the ends of the hand grip (1; 31).

11. The handling aid as claimed in claim 1, wherein the introduction opening (11; 12; 35; 36) of each longitudinal slot (13; 14; 37; 38) is arranged, in the immediate vicinity of the ends of the hand grip (1; 31), in a section of the bracket (2; 32) which runs essentially perpendicularly with respect to the longitudinal axis of the hand grip (1; 31).

12. A handling aid as claimed in claim 1 wherein said retaining or lifting means comprises a sling chain.

13. The handling aid as claimed in claim 1 wherein said retaining or lifting means comprises a hook.

14. The handling aid as claimed in claim 1 wherein said retaining or lifting means comprises an eyelet.

15. The handling aid as claimed in claim 1 wherein said retaining or lifting means comprises a gripping tool.

* * * * *